UNITED STATES PATENT OFFICE.

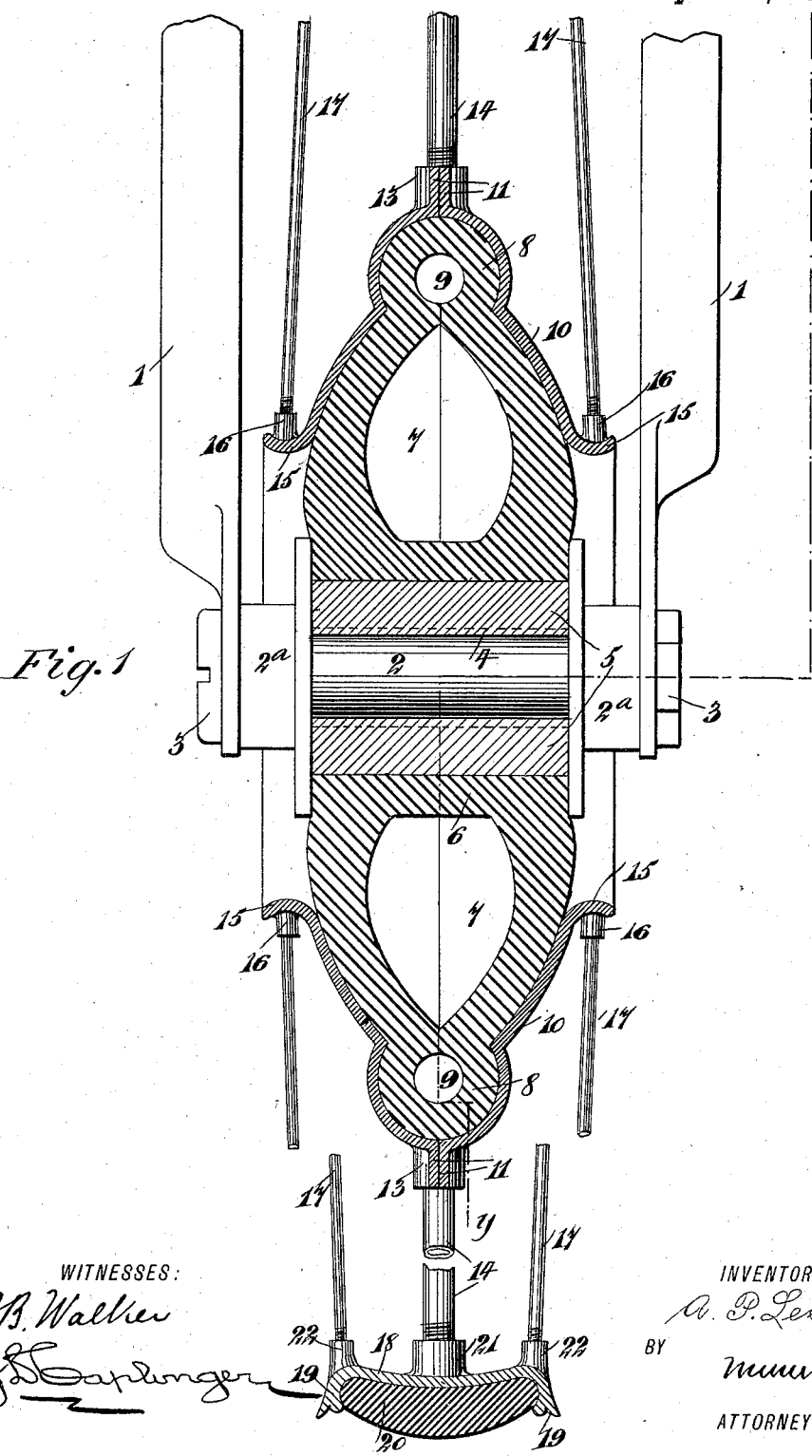

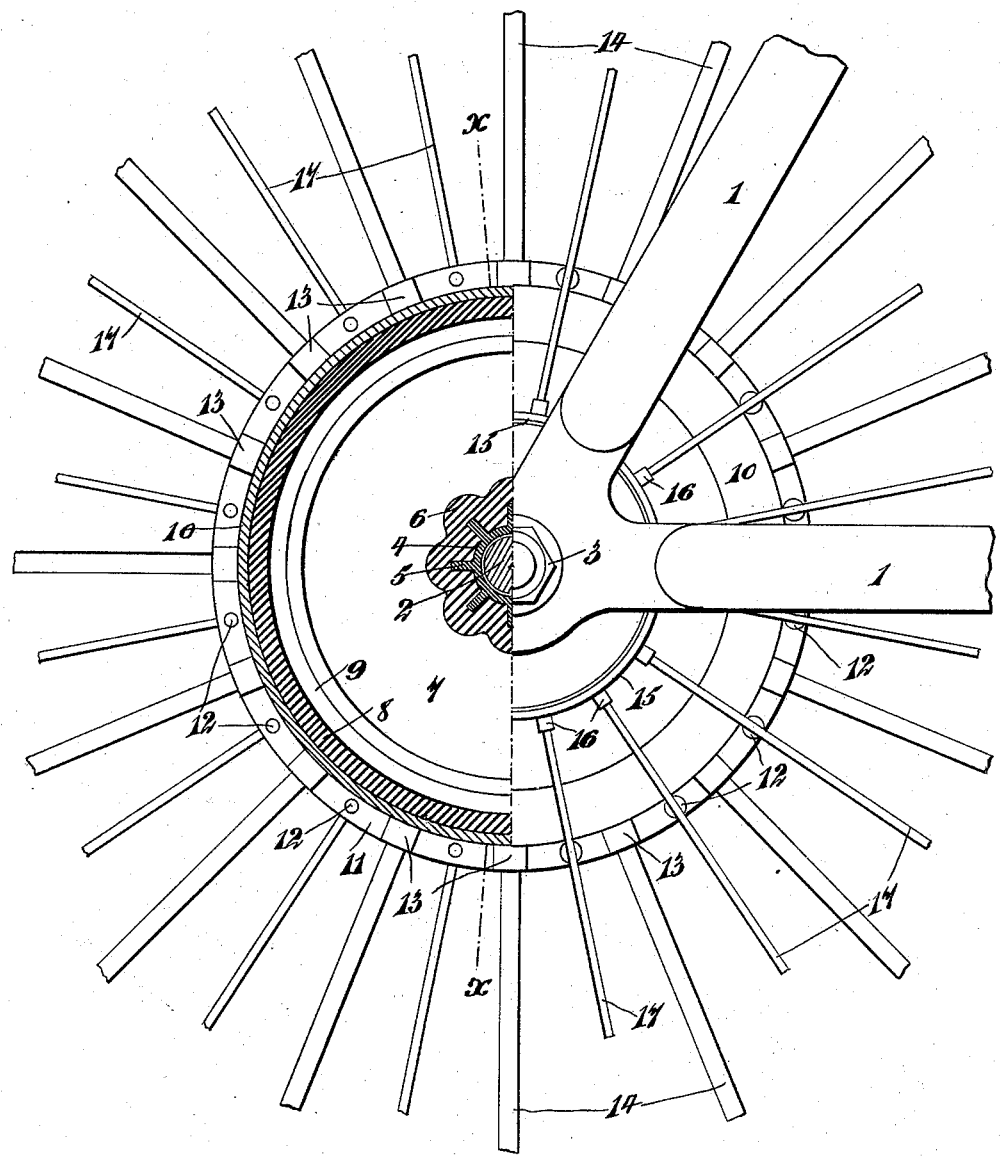

ALFRED P. LE GROS, OF LOUISVILLE, KENTUCKY.

WHEEL FOR BICYCLES.

SPECIFICATION forming part of Letters Patent No. 567,835, dated September 15, 1896.

Application filed February 3, 1896. Serial No. 577,908. (No model.)

*To all whom it may concern:*

Be it known that I, ALFRED P. LE GROS, of Louisville, in the county of Jefferson and State of Kentucky, have invented new and useful Improvements in Bicycles, of which the following is a full, clear, and exact description.

This invention relates to certain improvements in bicycles and similar vehicles, and has for its object to provide a pneumatic cushion connected with the wheel of a vehicle in such a way as to lessen the strain upon the parts and the general wear and tear caused by jolting over stones and rough roads.

The invention consists in a bicycle or equivalent vehicle, having wheels provided with hubs having pneumatic cushions, preferably constructed of rubber or similar elastic material, surrounding them and intervening the hubs and rim to which they are connected by spokes.

The invention also contemplates certain novel features of the construction, combination, and arrangement of the various parts of the improved device whereby certain important advantages are attained and the construction is made simpler, cheaper, and otherwise better adapted and more convenient for use than various other similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in both views.

Figure 1 is a sectional view taken axially on the line $x$ $x$ in Fig. 2 through a vehicle-wheel constructed in accordance with my invention; and Fig. 2 is a sectional side elevation of the hub portion of said wheel, the plane of the section being indicated by the line $y$ $y$ in Fig. 1.

In the views, 1 indicates the forks of a bicycle-frame, in the lower ends of which are journaled the opposite ends of the axle 2, extending between the forks and secured at its ends by means of nuts 3 on the latter. On the axle 2 is supported by suitable bearings $2^a$ a wheel-hub 4 of elongated cylindrical form, having projecting from its outer face a series of radial ribs or lugs 5, clearly shown in Fig. 2, said lugs or ribs being adapted to fit in recesses formed in the inner part 6 of an elastic hub-cushion provided with an air-chamber 7, as clearly shown in Fig. 1, and having its outer part or periphery formed with an annular enlarged portion 8, having a hollow 9 in its interior, as clearly shown.

On the cushion is mounted a casing comprising two similar sections 10 of sheet metal, said sections being of annular form and adapted to fit the outer portion of the cushion, to which they are held by means of the enlarged portion 8 of the cushion, and being secured together by means of flanges 11, provided on their adjacent edges, through which flanges bolts or rivets 12 are passed, as clearly shown in Fig. 2. Between the bolts or rivets 12 sockets 13 are formed in the flanges 11, said sockets being adapted to receive the inner ends of tubular spokes 14. The inner edges of the respective sections 10 of the casing of the cushion are bent outwardly in opposite directions, as clearly shown at 15 in Fig. 1, and are provided with sockets 16, adapted to receive the inner ends of solid spokes 17 of less diameter than the tubular spokes 14, as clearly shown in the drawings.

18 indicates the rim of the wheel, which is constructed of sheet metal in annular form, being provided with outwardly-bent edge portions 19, between which is arranged a solid tire 20, which may be formed of rubber or other suitable material, and the edges 19 of the rim are arranged to extend beyond the face of the tire 20 at the edge portions thereof, so that in turning a secure hold will be afforded the tire upon the ground. The tire is provided on its inner face with centrally-arranged sockets 21 to receive the outer ends of the spokes 14, and along its opposite edges with other sockets 22 to receive the outer ends of the spokes 17, arranged on opposite sides of the central spokes 14, the outer ends of all of the spokes being threaded to permit of their being adjustably secured in said sockets.

By the construction of the wheel as above described it will be evident that the jolting of the vehicle in passing over stones and rough roads will be relieved by the elastic cushion at the hub, and said cushion is so arranged that it is not liable to be perforated or worn, as is the case with ordinary pneumatic tires. It will also be seen that the construction is extremely light and simple and well adapted for use on bicycles and similar light road-vehicles, and it will also be obvious from the above description that the device is susceptible of considerable modification without material departure from the principles and spirit of the invention, and for this reason I do not wish to be understood as limiting myself to the precise construction and arrangement of the parts herein set forth.

Having thus described my invention, I claim as new and desire to secure by Letters Patent—

1. A wheel, comprising a sleeve-like hub, a chambered cushion secured to the hub and provided with an annular hollow enlargement on its periphery, a sectional casing resting upon the outer portion of the cushion, a rim, and spokes connecting the rim with the casing, substantially as described.

2. A wheel, consisting of a hub comprising a sleeve-like hub, a chambered cushion secured to the hub, and a casing fitting upon the cushion, a rim and spokes connecting the central and side portions of the casing with the rim, substantially as described.

3. In a wheel, the combination with a sleeve-like hub, of a cushion secured on the hub, and a casing fitting on the cushion and provided with spoke-sockets at the center and at each side of the center, substantially as described.

4. In a vehicle-wheel, the combination of an axle, a hub arranged to turn thereon, a cushion secured to the hub and encircling the same, a casing comprising two annular sections secured together and arranged on opposite sides of the cushion, said casing having centrally-arranged sockets and having its edge portions provided with sockets on opposite sides of the centrally-arranged sockets, a wheel-rim, and spokes extending from the rim to the sockets on the casing, substantially as set forth.

5. In a vehicle-wheel, the combination of an axle, a hub arranged to turn thereon, a cushion secured to and encircling the hub and provided at its outer part with an enlarged portion, a casing comprising two sections of annular form arranged to fit the opposite sides of the cushion, and held in place thereon by engagement with the enlarged portion thereof, sockets carried by the casing, a wheel-rim, and spokes extending from the rim to the sockets on the casing, substantially as set forth.

ALFRED P. LE GROS.

Witnesses:
WM. GABLE,
H. L. DORMAN.